United States Patent
Egawa et al.

(10) Patent No.: US 11,781,251 B2
(45) Date of Patent: Oct. 10, 2023

(54) BASE FABRIC FOR AIRBAG AND MANUFACTURING METHOD FOR BASE FABRIC FOR AIRBAG

(71) Applicant: Toray Industries, Inc., Tokyo (JP)

(72) Inventors: Yusuke Egawa, Osaka (JP); Taiki Hosaka, Osaka (JP)

(73) Assignee: Toray Industries, Inc., Tokyo (JP)

( * ) Notice: Subject to any disclaimer, the term of this patent is extended or adjusted under 35 U.S.C. 154(b) by 287 days.

(21) Appl. No.: 17/435,119

(22) PCT Filed: Feb. 19, 2020

(86) PCT No.: PCT/JP2020/006618
§ 371 (c)(1),
(2) Date: Aug. 31, 2021

(87) PCT Pub. No.: WO2020/179456
PCT Pub. Date: Sep. 10, 2020

(65) Prior Publication Data
US 2022/0042216 A1  Feb. 10, 2022

(30) Foreign Application Priority Data
Mar. 4, 2019  (JP) .................. 2019-038271

(51) Int. Cl.
| | | |
|---|---|---|
| *D03D 1/02* | (2006.01) | |
| *B60R 21/235* | (2006.01) | |
| *B60R 21/16* | (2006.01) | |

(52) U.S. Cl.
CPC ............. *D03D 1/02* (2013.01); *B60R 21/235* (2013.01); *B60R 2021/23509* (2013.01); *B60R 2021/23542* (2013.01); *D10B 2331/02* (2013.01); *D10B 2505/124* (2013.01)

(58) Field of Classification Search
CPC ...... D03D 1/02; D03D 13/008; D03D 15/283; D03D 15/573; B60R 21/235; B60R 2021/23509; B60R 2021/23542; D10B 2331/02; D10B 2505/124
See application file for complete search history.

(56) References Cited

U.S. PATENT DOCUMENTS

| | | | |
|---|---|---|---|
| 7,585,795 B2 * | 9/2009 | Yakake | D06N 3/14 442/334 |
| 2011/0020628 A1 * | 1/2011 | Fukudome | C08G 69/28 428/221 |
| 2022/0042216 A1 * | 2/2022 | Egawa | D03D 13/008 |
| 2022/0049383 A1 * | 2/2022 | Hosaka | D03D 15/283 |

FOREIGN PATENT DOCUMENTS

| | | | | |
|---|---|---|---|---|
| CN | 106381546 A | * | 2/2017 | ............. C08G 63/16 |
| EP | 2042628 B1 | | 10/2013 | |
| JP | H01-173185 | | 12/1989 | |
| JP | H09-105047 A | | 4/1997 | |
| JP | H10-8344 A | | 1/1998 | |
| JP | 2003-003340 A | | 1/2003 | |
| JP | 2007-217860 A | | 8/2007 | |
| JP | 2008-081873 A | | 4/2008 | |
| WO | 2014/123090 A1 | | 8/2014 | |

OTHER PUBLICATIONS

English translation of the International Preliminary Report on Patentability including the Written Opinion of corresponding PCT/JP2020/006618 dated Sep. 16, 2021.
Examination Report dated Dec. 8, 2022, of counterpart Indian Patent Application No. 202147042444.

* cited by examiner

*Primary Examiner* — Robert H Muromoto, Jr.
(74) *Attorney, Agent, or Firm* — DLA Piper LLP (US)

(57) ABSTRACT

A base fabric for an airbag is formed of a polyamide fiber, wherein a CV value of a weaving density for every 20 cm in a base fabric weft direction is equal to or less than 0.5%, and original-yarn strength usage rates in the warp direction and the weft direction are equal to or more than 85%.

6 Claims, No Drawings

BASE FABRIC FOR AIRBAG AND MANUFACTURING METHOD FOR BASE FABRIC FOR AIRBAG

TECHNICAL FIELD

This disclosure relates to a base fabric for an airbag, an airbag, and a manufacturing method for a base fabric for an airbag.

BACKGROUND

In recent years, to ensure the safety of a passenger at the time of a vehicle collision, various types of airbags are mounted to a vehicle so that a protection function for a passenger is enhanced. Examples of the various types of airbags include an airbag for protecting a driver, an airbag for protecting a passenger seat occupant, an airbag for protecting knees, an airbag built in a seat for protecting a chest, and an airbag mounted behind a ceiling above an upper part of a window for protecting a head. In particular, in view of protecting a passenger, an airbag for protecting a driver and an airbag for protecting a passenger seat occupant are being increased in size. However, an airbag having a large size has higher inflator output for improvement in expansion rate, and cushion internal pressure is higher. Thus, when there is unevenness in the weaving density of an airbag base fabric, stress given at the time of expansion concentrates at a part having low weaving density, that is, a part having relatively low strength, which may lead to bursting of the airbag. Therefore, there has been a demand for a base fabric to be used for an airbag to have even weaving density.

Moreover, there has been a demand for an airbag to have such characteristics that the airbag does not burst (burst resistance) by an impact given at the time of expansion or cushion internal pressure. Therefore, to obtain an airbag excellent in burst resistance, there has been a demand for a base fabric to maximally utilize an original-yarn strength of an original yarn to be used (high original-yarn strength utilization rate).

Further, since the airbag base fabric is a fabric, in general, a loom is used to obtain the airbag base fabric. In general, a loom includes a rubber roll at a take-up portion and takes up a fabric while nipping the fabric with the rubber roll. When the nipping force is low, the unevenness in the weaving density of the fabric becomes greater during weaving, with the result that occurrence of weaving bar defects during stoppage of a loom causes a problem in quality. When an airbag is fabricated with use of a fabric having a large unevenness in weaving density and having weaving bar defects, it may lead to bursting of the airbag at the time of expansion due to degradation in strength at the part having a low weaving density and a weaving bar part.

As a method of obtaining a fabric having an even air permeability, for example, in JP 9-105047 A, there is proposed a polyester fabric which is finished through a roller compression setting step. Moreover, in JP 10-8344 A, there is proposed a base fabric formed of a polyester filament processed through a step including a roller setting step and a stenter setting step in combination. Further, in JP 2008-81873 A, there is proposed a method of obtaining an even air permeability by constantly keeping a warp tension in a width direction given at the time of weaving to have an even crimp rate.

According to JP '047, a compression process is performed through a roller compression setting step. Therefore, due to the compression unevenness in the width direction, the evenness of the air permeability in the width direction is no sufficient. Moreover, according to JP '344, the roller setting step and the stenter setting step are performed in combination as the compression setting step. Therefore, even though the cost is high, the air permeability is evenly set as a whole by changing a state of a fabric surface. Meanwhile, there is no description as to the evenness in density. Further, JP '873 applies oil to the warp to obtain the evenness in the air permeability in the width direction. That method cannot be applied to a base fabric that does not require oil at the time of weaving. Further, there is no description as to the evenness in weaving density.

It could therefore be helpful to provide a base fabric for an airbag excellent in evenness in weaving density and excellent in original-yarn strength utilization rate, an airbag fabricated by sewing the base fabric for an airbag, and a manufacturing method for the base fabric for an airbag.

SUMMARY

We thus provide a base fabric for an airbag, which is a fabric formed of a polyamide fiber, wherein a CV value of a weaving density in a warp direction and a weft direction for every 20 cm in a base fabric weft direction is equal to or less than 0.5%, and original-yarn strength utilization rates in the warp direction and the weft direction calculated based on Expressions (1) and (2) are equal to or more than 85%:

$$(\text{warp}) = T1(N)/(t1(\text{cN/dtex})/100 \times F1(\text{dtex}) \times D1(\text{threads/inch})/2.54 \times 5(\text{cm})) \times 100(\%) \quad (1)$$

$$(\text{weft}) = T2(N)/(t2(\text{cN/dtex})/100 \times F2(\text{dtex}) \times D2(\text{threads/inch})/2.54 \times 5(\text{cm})) \times 100(\%) \quad (2)$$

T1: warp-direction tensile strength (N)

T2: weft-direction tensile strength (N)

t1: tenacity per 1 dtex of a yarn used for the warp (cN/dtex)

t2: tenacity per 1 dtex of a yarn used for the weft (cN/dtex)

F1: warp total fineness (dtex)

F2: weft total fineness (dtex)

D1: warp-direction weaving density (threads/inch)

D2: weft-direction weaving density (threads/inch).

We also provide a manufacturing method for a base fabric for an airbag, which is a method of manufacturing the base fabric for an airbag described above, wherein a weaving step includes equipment configured to take up a base fabric, and wherein, in the equipment, the base fabric is taken up with a rubber roll having a surface roughness of from 75 μm to 110 μm.

Further, we provide an airbag fabricated by sewing the base fabric for an airbag described above.

DETAILED DESCRIPTION

Base Fabric for Airbag

A base fabric for an airbag according to one example (hereinafter "base fabric") is a fabric fabricated by weaving a polyamide fiber. In the base fabric, a CV value of a weaving density in a warp direction and a weft direction for every 20 cm in a base fabric weft direction is equal to or less than 0.5%. In the base fabric, original-yarn strength utilization rates in the warp direction and the weft direction calculated based on Expressions (1) and (2) are equal to or more than 85%:

$$(\text{warp}) = T1(N)/(t1(\text{cN/dtex})/100 \times F1(\text{dtex}) \times D1 \\ (\text{threads/inch})/2.54 \times 5(\text{cm})) \times 100(\%) \quad (1)$$

$$(\text{weft}) = T2(N)/(t2(\text{cN/dtex})/100 \times F2(\text{dtex}) \times D2(\text{threads/inch})/2.54 \times 5(\text{cm})) \times 100(\%) \quad (2)$$

T1: warp-direction tensile strength (N)
T2: weft-direction tensile strength (N)
t1: tenacity per 1 dtex of a yarn used for the warp (cN/dtex)
t2: tenacity per 1 dtex of a yarn used for the weft (cN/dtex)
F1: warp total fineness (dtex)
F2: weft total fineness (dtex)
D1: warp-direction weaving density (threads/inch)
D2: weft-direction weaving density (threads/inch).
Fabric obtained by weaving Polyamide Fiber Examples of the polyamide fiber include fibers formed of nylon 6, nylon 6,6, nylon 12, nylon 46, copolyamide of nylon 6 and nylon 6,6, and copolyamide obtained through copolymerization of nylon 6 with polyalkylene glycol, dicarboxylate, or amine. It is preferred that the polyamide fiber be fiber formed of nylon 6 or nylon 6,6, which provide excellent impact resistance for an airbag to be obtained.

In this example, a total fineness of the polyamide fiber is not particularly determined. It is preferred that the total fineness of the polyamide fiber be equal to or more than 235 dtex, more preferably equal to or more than 280 dtex. Further, it is preferred that the total fineness of the polyamide fiber be equal to or less than 940 dtex, more preferably equal to or less than 700 dtex. When the total fineness falls within the above-mentioned range, an airbag to be obtained is likely to have required mechanical characteristics (such as tensile strength and tear strength) and is excellent in lightness and compactness. The total fineness of the polyamide fiber is calculated based on the method A of JIS L 1013(1999)8.3.1.

Further, in this example, a single fiber fineness of the polyamide fiber is not particularly limited. It is preferred that the single fiber fineness of the polyamide fiber be equal to or more than 1 dtex, more preferably equal to or more than 1.5 dtex, further preferably equal to or more than 2 dtex. Further, it is preferred that the single fiber fineness of the polyamide fiber be equal to or less than 8 dtex, more preferably equal to or less than 7 dtex. When the single fiber fineness of the polyamide fiber is equal to or more than 1 dtex, single fiber breakage at the time of manufacture can be suppressed, and hence the fiber can easily be manufactured. Further, when the single fiber fineness of the polyamide fiber is equal to or less than 8 dtex, the flexibility of the warp and the weft to be obtained is improved. The single fiber fineness of the polyamide fiber is calculated by dividing the total fineness by the number of filaments. The number of filaments is calculated based on the method of JIS L 1013(1999)8.4. In this example, the number of filaments of the polyamide fiber is not particularly limited. It is preferred that the number of filaments of the polyamide fiber be from 44 to 144, more preferably from 72 to 136. When the number of filaments of the polyamide fiber falls within the above-mentioned range, the amount of air passing through single yarns becomes appropriate, and hence a predetermined air permeability is likely to be obtained. Moreover, when the number of filaments of the polyamide fiber falls within the above-mentioned range, the single fiber fineness becomes appropriate. Thus, at the time of warping and at the time of weaving, damage due to scratch by a guide or a reed is less liable to occur, and fluffing or the like caused by scratch on the warp is less liable to occur. Therefore, productivity is excellent.

A sectional shape of the single fiber of the polyamide fiber is not particularly limited. For example, the sectional shape of the single fiber may be a circular shape, a shape among various non-circular shapes such as an X-shape, a C-shape, a Y-shape, a V-shape, and a flat shape, or a shape having a hollow part. Among those shapes, in view of ease of spinning, it is preferred that the sectional shape of the single fiber be the circular shape.

It is preferred that a tenacity of the polyamide fiber of this example be equal to or more than 8.0 cN/dtex, more preferably equal to or more than 8.4 cN/dtex. When the tenacity of the polyamide fiber falls within the above-mentioned range, a base fabric to be obtained is likely to obtain sufficient mechanical characteristics (such as tensile strength and tear strength). An upper limit of the tenacity is not particularly limited. The tenacity of the polyamide fiber is calculated through measurement under the constant rate extension conditions specified in the JIS L 1013(1999)8.5.1 standard test.

It is preferred that the elongation of the polyamide fiber of this example be equal to or more than 20%, more preferably equal to or more than 21%. Further, it is preferred that the elongation of the polyamide fiber be equal to or less than 25%, more preferably equal to or less than 24%. When the elongation of the polyamide fiber falls within the above-mentioned range, a fabric to be obtained is excellent in toughness and breaking work quantity. Further, the polyamide fiber exhibiting the elongation that falls within the above-mentioned range may be improved in ease of spinning and ease of weaving. The elongation of the polyamide fiber may be calculated based on the extension given at a point indicating the maximum strength on an S-S curve obtained at the time of calculating the above-mentioned tenacity.

For the polyamide fiber of this example, to improve the productivity of a spinning step, a elongation step, and a processing step or characteristics of a fabric to be obtained, additives such as a heat stabilizer, an antioxidant, a light stabilizer, a lubricating agent, an antistatic agent, a plasticizer, a thickener, a pigment, and a fire retardant may suitably be blended.

For the base fabric according to this example, it is important that a CV value of a weaving density in a warp direction and a weft direction measured based on the method of JIS L 1096(1999) 8.6.1 for every 20 cm be equal to or less than 0.5% and that original-yarn strength utilization rates in the warp direction and the weft direction be equal to or more than 85%. With regard to the weaving density, when the CV value of any of the directions exceeds 0.5%, unevenness in mechanical strength and internal pressure performance may occur depending on a cutting position of the base fabric to be used for an airbag, and hence it is not preferable. Moreover, when the original-yarn strength utilization rate is less than 85%, burst may occur due to insufficient mechanical strength of the base fabric to be used for an airbag, and hence it is not preferable.

The original-yarn strength utilization rates in the warp direction and the weft direction are calculated based on Expressions (1) and (2). 1 inch is equivalent to 2.54 cm. Moreover, in this example, the warp direction corresponds to the direction of the warp, and the weft direction corresponds to the direction of the weft.

$$(\text{warp}) = T1(N)/(t1(\text{cN/dtex})/100 \times F1(\text{dtex}) \times D1 \\ (\text{threads/inch})/2.54 \times 5(\text{cm})) \times 100(\%) \quad (1)$$

$$(\text{weft}) = T2(N)/(t2(\text{cN/dtex})/100 \times F2(\text{dtex}) \times D2(\text{threads/inch})/2.54 \times 5(\text{cm})) \times 100(\%) \quad (2)$$

T1: warp-direction tensile strength (N)
T2: weft-direction tensile strength (N)
t1: tenacity per 1 dtex of a yarn used for the warp (cN/dtex)
t2: tenacity per 1 dtex of a yarn used for the weft (cN/dtex)
F1: warp total fineness (dtex)
F2: weft total fineness (dtex)
D1: warp-direction weaving density (threads/inch)
D2: weft-direction weaving density (threads/inch)

It is preferred that a tensile strength of the base fabric based on the method of IS013934-1 be equal to or more than 3000 N/cm in both the warp direction and the weft direction, more preferably equal to or more than 3125 N/cm, further preferably equal to or more than 3250 N/cm. An upper limit of the tensile strength is not particularly limited. When the tensile strength falls within the above-mentioned range, an airbag to be obtained is likely to obtain the mechanical strength required at the time of expansion.

It is preferred that a total weight of the base fabric based on JIS L 1096(1999) 8.4.2 be equal to or less than 220 g/m$^2$, more preferably equal to or less than 215 g/m$^2$. When the total weight falls within the above-mentioned range, an airbag to be obtained has an appropriate weight. Incidentally, reduction in weight of the base fabric also directly affects fuel consumption of an automobile. Therefore, it is better to set a lower limit of the total weight as low as possible. Meanwhile, in view of a required heat resistance capacity, it is preferred that the lower limit of the total weight be equal to or more than 150 g/m$^2$.

It is preferred that a thickness of the base fabric be equal to or less than 0.35 mm, more preferably equal to or less than 0.33 mm. When the thickness of the base fabric falls within the above-mentioned range, the base fabric is excellent in compactness. Moreover, a vehicle to which the airbag is mounted is likely to provide a sufficient space for passengers. Further, the vehicle is likely to be enhanced in the degree of freedom in design of a cabin.

In general, a weaving bar defect is disposed of as debris at the time of fabricating a bag by sewing. It is preferred that a weaving bar defect be equal to or less than 1.0 parts/100 m, more preferably 0.7 parts/500 m. When the weaving bar defect of the base fabric falls within the above-mentioned range, the amount of disposal of the base fabric is small, and a high yield is obtained.

Airbag

The airbag according to one example is obtained by sewing the above-mentioned base fabric for an airbag. The airbag according to this example may be manufactured by a known method. For example, the airbag can be manufactured by sewing the base fabric for an airbag into a known bag-like shape by a sewing method that is known.

Airbag Module

The airbag module according to one example includes the above-mentioned airbag. The airbag module according to this example may be manufactured by a known method. That is, the airbag module is manufactured by mounting an attachment device such as an inflator to an airbag.

As specifically described in the above-mentioned example, the base fabric forming the airbag is excellent in weaving density evenness in the base fabric weft direction and original-yarn strength utilization rate. Therefore, the airbag according to this example can obtain even internal pressure retention performance and passenger restraining performance regardless of a cutting position of the base fabric. Therefore, an airbag is useful as, for example, an airbag for protecting a driver, an airbag for protecting a passenger seat occupant, an airbag for protecting knees, an airbag built in a seat for protecting a chest, and an airbag mounted behind a ceiling above an upper part of a window for protecting a head.

Manufacturing Method for Base Fabric for Airbag

A manufacturing method for a base fabric for an airbag according to one example (hereinafter "manufacturing method for a base fabric") is a method of manufacturing the base fabric for an airbag according to the example described above. The manufacturing method for a base fabric is characterized in that a surface roughness of a base fabric take-up portion roller in a weaving step is adjusted to 75 μm to 110 μm. Thus, other steps described below are mere examples, and may be suitably replaced with other known steps.

According to this example, first, the warp described above is subjected to warping and then is placed on a loom. Similarly, the weft is placed on the loom. The loom is not particularly limited. Specifically, examples of the loom include a water jet loom, an air jet loom, and a rapier loom. Among those looms, it is preferred that the loom be the water jet loom because high-speed weaving is relatively easy and the productivity can easily be enhanced. It is preferred that the warp and the weft be the polyamide fiber of the same kind. Further, it is preferred that the warp and the weft be woven so as to have the same weaving density. In this example, "the polyamide fiber of the same kind" means that the fibers are the same in kind of polymer, total fineness, and physical property. Further, "the same weaving density" means that a difference in weaving density between the warp and weft after weaving is within 1.5 threads. The weaving density is calculated based on JIS L 1096(1999)8.6.1.

Conditions of weaving are not particularly limited, but it is preferred that the weaving be performed with a warp tension being adjusted to 60 eV$^-$ thread to 100 eV$^-$ thread. When the warp tension falls within the above-mentioned range, at the time of threading the weft, the warp yarn having the tension applied thereto is formed into a flat shape and, hence, the air permeability can be controlled to be lower. When the warp tension is equal to or less than 60 cN/end, the force of restraining the weft by the warp is weak, with the result that it is difficult to achieve a predetermined density. Further, when the warp tension is higher than 100 cN/end, low air permeability can be obtained, but fluffing due to scratch occurs in the warp, and the productivity is degraded. Thus, such warp tension is not favorable.

A method of adjusting the warp tension is not particularly limited. For example, the warp tension may be adjusted by, for example, a method of adjusting a warp feeding rate of the loom or a method of adjusting a threading rate of the weft. Whether the warp tension falls within the above-mentioned range may be checked by measuring a tension acting on the entire warp, for example, with use of a warp beam and a load cell of a back roller during operation of the loom.

A waving density unevenness in the base fabric weft direction is described. The weaving density in the base fabric weft direction is determined by, for example, a sectional shape and a crimp rate of the fiber forming the base fabric. In the high-density weaving as in the base fabric for an airbag, the warp is set to the high tension and the weft is forcibly woven. Thus, the crimp tends to be smaller (straight) due to the high warp tension, and the weft tends to return toward the reed. Therefore, to maintain a desired weaving density in the weft direction, it is required that a state in which the weft is woven be nipped. As a method of nipping the weft in the woven state, for example, improvement of a bar temple and the shape of the inner tube are carried out. In view of such a circumstance, we found that, as a further improvement, an even weaving density and excellent original-yarn strength utilization rate can both be achieved by controlling the surface roughness of the rubber roll.

In the manufacturing method for a base fabric for an airbag, equipment configured to take up a base fabric is provided as equipment of a weaving step, and the equipment includes a take-up portion. It is preferred that the woven base fabric be taken up with use of the rubber roll of the take-up portion. A material of the rubber roll is not particularly limited. Examples of a material of the rubber roll include synthetic rubber, natural rubber, silicon rubber, and urethane rubber. Among those, the synthetic rubber is preferred as a material of the rubber roll because the synthetic rubber is excellent in wear resistance and oil resistance. It is preferred that the number of the rubber rolls of the take-up portion be equal to or more than three and equal to or less than five. When the number of rubber rolls fall within the above-mentioned range, the nipping force given at the time of taking up the base fabric is high, and weaving of the weft is stabilized. Thus, a predetermined weft-direction weaving density is likely to be achieved. When the number of rubber rolls is less than three, the nipping force given at the time of taking up the base fabric is low. Thus, weaving of the weft is not stabilized, and the predetermined weft-direction weaving density is less likely to be achieved. Therefore, it is not favorable. Meanwhile, when the number of rubber rolls is equal to or more than six, a way of allowing the base fabric to pass through the take-up portion is complicated, and the productivity is degraded. Therefore, it is not favorable. The surface roughness of the rubber roll is equal to or more than 75 μm and equal to or less than 110 μm. When the surface roughness of the rubber roll falls within the above-mentioned range, the fabric slipping at the rubber roll of the take-up portion becomes smaller, and the warp tension in the width direction given at the time of weaving becomes more even. Therefore, an even weft density can be obtained. When the surface roughness is less than 75 μm, the warp tension in the width direction becomes more uneven, and the unevenness of the weft density tends to increase. Meanwhile, when the surface roughness exceeds 110 μm, the slipping at the rubber roll of the take-up portion is small, and a fabric in which the warp tension in the width direction given at the time of weaving becomes more even and an even weft density can be obtained is subjected to damage on its surface due to the rough surface, and the original-yarn strength utilization rate tends to be lower. It is preferred that a surface roughness CV value of the rubber roll be equal to or less than 2.5%. When the surface roughness CV value of the rubber roll falls within the above-mentioned range, the warp tension in the width direction becomes more even. Therefore, variation in even weft density is likely to be suppressed. The surface roughness CV value is a value measured by any of the methods described in the section of Example.

After weaving, the obtained fabric is subjected to a scouring process as needed. In the scouring step, the fabric is placed in, for example, a plurality of baths and rinsed therein. At that time, a scouring agent (for example, a non-ion surfactant or an anion surfactant) is suitably blended. A water temperature of each bath is suitably about 40° C. to about 70° C. With this, the scouring agent is activated so that, for example, an oil agent or wax adhering to a yarn may be efficiently removed.

After the scouring process is terminated, a drying/heat setting process is performed. A drying step is not particularly limited. It is preferred that the drying step be carried out at a temperature of from 90° C. to 150° C. A heat setting temperature is not particularly limited. It is preferred that the heat setting step be carried out at a temperature of 120° C. to 200° C. Further, it is preferred that the tension in the warp direction at the time of heat setting be 0.1 kg/cm to 0.5 kg/cm and that the tension in the weft direction at the time of heat setting be 0.1 kg/cm to 0.3 kg/cm. A device to be used for the heat setting step is not particularly limited. It is preferred that the device to be used for the heat setting step be, for example, a pin stenter or a clip stenter capable of controlling contraction of the base fabric in the width direction.

The base fabric obtained in the manner described above is excellent in weaving density in the base fabric weft direction and evenness in mechanical strength, and is further excellent in original-yarn strength utilization rate. Therefore, the base fabric can achieve even internal pressure characteristics and passenger restraining performance regardless of a cutting position and is particularly useful as a base fabric for an airbag.

In the above, one example is described. This disclosure, however, is not especially limited to the above-mentioned example. The example described above mainly describes our base fabrics and methods having the following configuration.

(1) A base fabric for an airbag formed of a polyamide fiber, wherein a CV value of a weaving density in a warp direction and a weft direction for every 20 cm in a base fabric weft direction is equal to or less than 0.5%, and original-yarn strength utilization rates in the warp direction and the weft direction calculated based on Expressions (1) and (2) are equal to or more than 85%:

$$(\text{warp}) = T1(N)/(t1(\text{cN/dtex})/100 \times F1(\text{dtex}) \times D1(\text{threads/inch})/2.54 \times 5(\text{cm})) \times 100(\%) \quad (1)$$

$$(\text{weft}) = T2(N)/(t2(\text{cN/dtex})/100 \times F2(\text{dtex}) \times D2(\text{threads/inch})/2.54 \times 5(\text{cm})) \times 100(\%) \quad (2)$$

T1: warp-direction tensile strength (N)
T2: weft-direction tensile strength (N)
t1: tenacity per 1 dtex of a yarn used for the warp (cN/dtex)
t2: tenacity per 1 dtex of a yarn used for the weft (cN/dtex)
F1: warp total fineness (dtex)
F2: weft total fineness (dtex)
D1: warp-direction weaving density (threads/inch)
D2: weft-direction weaving density (threads/inch).

(2) The base fabric for an airbag according to Item (1), wherein the number of weaving bar defects is equal to or less than 1.0 points/100 m.

(3) A method of manufacturing the base fabric for an airbag according to Item (1) or Item (2), wherein equipment configured to take up a base fabric is provided in a weaving step, and in the equipment, the base fabric is taken up with a rubber roll having a surface roughness of from 75 μm to 110 μm.

(4) An airbag, which is fabricated by sewing the base fabric for an airbag according to Item (1) or Item (2).

EXAMPLES

Our base fabrics and methods are specifically described with Examples. This disclosure, however, is not limited by those Examples. In the following Examples, respective characteristic values were calculated by the following method.

Calculation Method for Characteristic Values
Total Fineness

The total fineness was calculated by measuring a fineness based on corrected mass at a predetermined load of 0.045 cN/dtex by the method A of JIS L 1013(1999) 8.3.1. Number of Filaments The number of filaments was calculated based on the method of JIS L 1013(1999) 8.4.
Single Fiber Fineness The single fiber fineness was calculated by dividing the total fineness by the number of filaments.
Tenacity and Elongation of Filament The tenacity and the elongation were calculated through measurement under constant-rate elongation conditions specified in the JIS L 1013(1999) 8.5.1 standard test. TENSILON UCT-100 manufactured by ORIENTEC CO., LTD. was used with a grab interval of 25 cm and a tensile speed of 30 cm/min. The elongation was measured based on the elongation given at a point at which the maximum strength was indicated on the S-S curve.
Weaving Density The weaving densities of the warp and the yarn were calculated based on JIS L 1096(1999) 8.6.1. Specifically, a sample was placed on a flat table, and unnatural wrinkles and tension were removed. Then, the number of warp and weft for each section of 2.54 cm (warp direction 2.54 cm×weft direction 2.54 cm) at at least five positions for every 20 cm in the weft direction from an end of a base fabric piece were counted, and respective average values were calculated. The CV values were each calculated by dividing a standard deviation of data obtained for every 20 cm and multiplying the resultant by 100.
Total Weight The total weight was calculated, based on the JIS L 1096(1999) 8.4.2, by collecting 20 cm×20 cm test piece from the end of the base fabric piece for every 20 cm, measuring re-spective masses (g), and converting an average value of the resultant into a mass per 1 $m^2$ (g/$m^2$).
Thickness The thickness was measured, based on the method A of JIS L 1096:1999 8.5, for every 20 cm from the end of the base fabric piece, with use of a thickness measurement device having a circular measurement element with a diameter of 1.05 cm, under the pressure of 1.0 kPa, after waiting 10 seconds to have a settled thickness.
Surface Roughness Measurement The surface roughness was calculated by an evaluation method specified in ISO 25178 surface texture (surface roughness measurement). One-shot 3D shape measuring instrument VR-3000 manufactured by Keyence was used to measure a surface roughness (arithmetic mean height) at a 12× magnification. The surface roughness was measured based on weighted mean of collected data at five freely selected points. The CV values were each calculated by dividing a standard deviation of data obtained and multiplying the resultant by 100. Tensile Strength and Original-yarn Strength Utilization Rate The tensile strength was measured, based on the I5013934-1 method, by collecting three test pieces for each of the warp direction and the weft direction, removing yarns from both sides in the width to have a width of 50 mm, using a tensile tester to pull the test piece at a grab interval of 200 mm and a tensile speed of 200 mm/min until the test piece is broken, and measuring a maximum load before reaching the breakage. An average value was calculated for each of the warp direction and the weft direction. Further, with regard to the original-yarn strength utilization rates, tensile strengths were calculated based on Expressions (1) and (2) with use of a total fineness, a tenacity, and a weaving density of yarns to be used for a base fabric:

$$(\text{warp}) = T1(N)/(t1(\text{cN/dtex})/100 \times F1(\text{dtex}) \times D1 \\ (\text{threads/inch})/2.54 \times 5(\text{cm})) \times 100(\%) \qquad (1)$$

$$(\text{weft}) = T2(N)/(t2(\text{cN/dtex})/100 \times F2(\text{dtex}) \times D2(\text{threads/inch})/2.54 \times 5(\text{cm})) \times 100(\%) \qquad (2)$$

T1: warp-direction tensile strength (N)
T2: weft-direction tensile strength (N)
t1: tenacity per 1 dtex of a yarn used for the warp (cN/dtex)
t2: tenacity per 1 dtex of a yarn used for the weft (cN/dtex)
F1: warp total fineness (dtex)
F2: weft total fineness (dtex)
D1: warp-direction weaving density (threads/inch)
D2: weft-direction weaving density (threads/inch).

Number of Weaving Bar Defects

With regard to the weaving bar defects, a density abnormality equal to or more than 10 mm on the processed base fabric was counted visually, and the number of occurrence per 100 m was calculated.

Example 1

Preparation of Yarn

As the warp and weft, a non-twist synthetic fiber filament being formed of nylon 6,6, having a circular sectional shape, being formed of a filament having 136 single fibers with a single fiber fineness of 3.46 dtex, having an original-yarn fineness of 485 dtex, having a tenacity of 8.4 cN/dtex, and having an elongation of 23.5% was prepared.
Weaving The synthetic fiber filament described above was used as the warp and weft, and a fabric in which the weaving densities of the warp and weft are both 49 threads/2.54 cm and a width is 200 cm was woven with a water jet loom. In this example, five rubber rolls having a surface roughness of 107 μm in a loom take-up portion rubber roll were used to adjust the warp tension to 90 cN/end and set a loom rotation number to 660 rpm.
Scouring and Heat setting Next, the obtained fabric was scoured at 65° C. and dried at 120° C. After that, a pin stenter dryer was used to perform heat setting at 120° C. for 1 minute under dimensional restrictions with a width shrinkage rate of 0% and an overfeed ratio of 0%.

Example 2

Preparation of Yarn

As the warp and the weft, a synthetic fiber filament similar to that of Example 1 was prepared.
Weaving Next, weaving was performed by a method similar to that of Example 1. At that time, a rubber roll with a loom take-up portion rubber roll having a surface roughness of 76 μm was used, and settings similar to those of Example 1 were given.
Scouring and Heat Setting Next, the obtained fabric was suitably subjected to scouring, drying, and heat setting by a method similar to that of Example 1.

Example 3

Preparation of Yarn

As the warp and weft, a non-twist synthetic fiber filament being formed of nylon 6,6, having a circular sectional shape, being formed of a filament having 136 single fibers with a single fiber fineness of 2.68 dtex, having a raw-yarn fineness of 365 dtex, having a tenacity of 8.4 cN/dtex, and having an elongation of 23.5% was prepared.

Weaving

Next, the synthetic fiber filament described above was used as the warp and weft, and a fabric in which the weaving densities of the warp and weft are both 59 threads/2.54 cm and a width is 200 cm was woven with a water jet loom. In this example, five rubber rolls having a surface roughness of 106 μm in a loom take-up portion rubber roll were used to adjust the warp tension to 75 cN/end and set a loom rotation number to 660 rpm.

Scouring and Heat setting

Scouring was performed at 65° C., and drying was performed at 120° C. After that, a pin stenter dryer was used to perform heat setting at 160° C. for 1 minute under dimensional restrictions with a width shrinkage rate of 0% and an overfeed ratio of 0%.

Example 4

Preparation of Yarn

As the warp and the weft, a synthetic fiber filament similar to that of Example 3 was prepared.

Weaving

Next, weaving was performed by a method similar to that of Example 3. At that time, a rubber roll with a loom take-up portion rubber roll having a surface roughness of 80 μm was used, and settings similar to those of Example 3 were given.

Scouring and Heat setting

Next, the obtained fabric was suitably subjected to scouring, drying, and heat setting by a method similar to that of Example 3.

Example 5

Preparation of Yarn

As the warp and weft, a non-twist synthetic fiber filament being formed of nylon 6,6, having a circular sectional shape, being formed of a filament having 36 single fibers with a single fiber fineness of 3.26 dtex, having a raw-yarn fineness of 235 dtex, having a tenacity of 8.4 cN/dtex, and having an elongation of 24.0% was prepared.

Weaving

Next, the synthetic fiber filament described above was used as the warp and weft, and a fabric in which the weaving densities of the warp and weft are both 71 threads/2.54 cm and a width is 200 cm was woven with a water jet loom. In this example, five rubber rolls having a surface roughness of 103 μm in a loom take-up portion rubber roll were used to adjust the warp tension to 45 cN/end and set a loom rotation number to 660 rpm.

Scouring and Heat Setting

Next, the obtained fabric was scoured at 65° C. and dried at 120° C. After that, a pin stenter dryer was used to perform heat setting at 120° C. for 1 minute under dimensional restrictions with a width shrinkage rate of 0% and an overfeed ratio of 0%.

Comparative Example 1

Preparation of Yarn

As the warp and the weft, a synthetic fiber filament similar to that of Example 1 was prepared.

Weaving

Next, weaving was performed by a method similar to that of Example 1. At that time, a rubber roll with a loom take-up portion rubber roll having a surface roughness of 70 μm was used, and settings similar to those of Example 1 were given.

Scouring and Heat Setting

Next, the obtained fabric was suitably subjected to scouring, drying, and heat setting by a method similar to that of Example 1.

Comparative Example 2

Preparation of Yarn

As the warp and the weft, a synthetic fiber filament similar to that of Example 1 was prepared.

Weaving

Next, weaving was performed by a method similar to that of Example 1. At that time, a rubber roll with a loom take-up portion rubber roll having a surface roughness of 58 μm was used, and settings similar to those of Example 1 were given.

Scouring and Heat Setting

Next, the obtained fabric was suitably subjected to scouring, drying, and heat setting by a method similar to that of Example 1.

Comparative Example 3

Preparation of Yarn

As the warp and the weft, a synthetic fiber filament similar to that of Example 1 was prepared.

Weaving

Next, weaving was performed by a method similar to that of Example 1. At that time, a rubber roll with a loom take-up portion rubber roll having a surface roughness of 112 μm was used, and settings similar to those of Example 1 were given.

Scouring and Heat Setting

Next, the obtained fabric was suitably subjected to scouring, drying, and heat setting by a method similar to that of Example 1.

Comparative Example 4

Preparation of Yarn

As the warp and the weft, a synthetic fiber filament similar to that of Example 3 was prepared.

Weaving

Next, weaving was performed by a method similar to that of Example 3. At that time, a rubber roll with a loom take-up portion rubber roll having a surface roughness of 63 μm was used, and settings similar to those of Example 3 were given.

Scouring and Heat setting

Next, the obtained fabric was suitably subjected to scouring, drying, and heat setting by a method similar to that of Example 3.

Comparative Example 5

Preparation of Yarn

As the warp and the weft, a synthetic fiber filament similar to that of Example 5 was prepared.

Weaving

Next, weaving was performed by a method similar to that of Example 5. At that time, a rubber roll with a loom take-up portion rubber roll having a surface roughness of 69 μm was used, and settings similar to those of Example 5 were given.
Scouring and Heat Setting Next, the obtained fabric was suitably subjected to scouring, drying, and heat setting by a method similar to that of Example 5.

With regard to the base fabrics obtained in Examples 1 to 5 and Comparative Examples 1 to 5, tensile strengths, tear strengths, and results are shown in Table 1 based on the following evaluation method.
Evaluation Method
Tensile Strength of Base Fabric The tensile strength was measured, based on the I5013934-1 method, by collecting pieces for each of the warp direction and the weft direction for every 20 cm from the end of the base fabric, removing yarns from both sides in the width to have a width of 50 mm, using a constant-rate tensile tester to pull the test piece at a grab interval of 200 mm and a tensile speed of 200 mm/min until the test piece is broken, and measuring a maximum load before reaching the breakage. Then, an average value was calculated for each of the warp direction and the weft direction.

in internal pressure holding characteristics and passenger restraining performance of the airbag.

The invention claimed is:

1. A base fabric for an airbag formed of a polyamide fiber, wherein a CV value of a weaving density in a warp direction and a weft direction for every 20 cm in a base fabric weft direction is equal to or less than 0.5%, and original-yarn strength utilization rates in the warp direction and the weft direction calculated based on Expressions (1) and (2) are equal to or more than 85%:

wherein Expression 1 is defined as $$(\text{warp}) = T1(N)/(t1(\text{cN/dtex})/100 \times F1(\text{dtex}) \times D1(\text{threads/inch})/2.54 \times 5(\text{cm})) \times 100(\%);$$

Expression 2 is defined as $$(\text{weft}) = T2(N)/(t2(\text{cN/dtex})/100 \times F2(\text{dtex}) \times D2(\text{threads/inch})/2.54 \times 5(\text{cm})) \times 100(\%);$$

T1 is defined as warp-direction tensile strength (N);
T2 is defined as weft-direction tensile strength (N);
t1 is defined as tenacity per 1 dtex of a yarn used for the warp (cN/dtex);

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Original yarn used | Original yarn fineness (dtex) | | 485 | 485 | 365 | 365 | 235 | 485 | 485 | 485 | 365 | 235 |
| | Number of filaments (threads) | | 136 | 136 | 136 | 136 | 36 | 136 | 136 | 136 | 136 | 36 |
| | Strength(cN) | | 8.4 | 8.4 | 8.4 | 8.4 | 8.4 | 8.4 | 8.4 | 8.4 | 8.4 | 8.4 |
| Weaving conditions | Weaving tension (cN/tread) | | 90 | 90 | 75 | 75 | 45 | 90 | 90 | 90 | 75 | 45 |
| | Take-up portion rubber roll surface roughness | | 107 | 76 | 106 | 80 | 103 | 70 | 58 | 112 | 63 | 69 |
| | Take-up portion rubber roll surface roughness CV value | | 1.19 | 2.25 | 1.37 | 1.17 | 2.23 | 2.55 | 6.09 | 0.96 | 7.17 | 2.19 |
| | Number of take-up portion rubber rolls (roll) | | 5 | 5 | 5 | 5 | 5 | 5 | 5 | 5 | 5 | 5 |
| Processing conditions | Scouring temperature (° C.) | | 65 | 65 | 65 | 65 | 65 | 65 | 65 | 65 | 65 | 65 |
| | Drying temperature (° C.) | | 120 | 120 | 120 | 120 | 120 | 120 | 120 | 120 | 120 | 120 |
| | Heat Setting temperature (° C.) | | 120 | 120 | 160 | 160 | 120 | 120 | 120 | 120 | 160 | 120 |
| Base fabric physical properties | Density (thread/inch) | Warp | 48.9 | 48.9 | 60.5 | 60.7 | 74.3 | 49.0 | 48.7 | 48.9 | 59.5 | 71.5 |
| | | Weft | 49.5 | 49.5 | 61.3 | 60.6 | 72.7 | 49.6 | 49.6 | 49.4 | 60.0 | 71.3 |
| | Thickness (mm) | | 0.29 | 0.29 | 0.28 | 0.28 | 0.24 | 0.29 | 0.29 | 0.29 | 0.28 | 0.24 |
| | Total weight (g/m²) | | 201 | 201 | 191 | 190 | 152 | 201 | 201 | 201 | 184 | 147 |
| | Tensile strength (N) | Warp | 3496 | 3519 | 3399 | 3395 | 2661 | 3527 | 3518 | 3304 | 3025 | 2562 |
| | | Weft | 3651 | 3635 | 3496 | 3454 | 2746 | 3628 | 3664 | 3555 | 3236 | 2694 |
| | Strength utilization rate (%) | Warp | 89 | 90 | 93 | 93 | 92 | 90 | 90 | 84 | 84 | 92 |
| | | Weft | 92 | 91 | 95 | 95 | 97 | 91 | 92 | 90 | 89 | 97 |
| CV value (%) | Density (threads/inch) | Warp | 0.45% | 0.50% | 0.46% | 0.49% | 0.18% | 0.80% | 1.41% | 0.42% | 0.90% | 1.16% |
| | | Weft | 0.34% | 0.44% | 0.29% | 0.38% | 0.15% | 1.01% | 1.42% | 0.31% | 0.80% | 0.69% |
| Standard deviation/ average value * 100 | Thickness (mm) | | 0.0% | 0.0% | 0.0% | 0.0% | 0.0% | 0.0% | 0.0% | 0.0% | 0.0% | 0.0% |
| | Total weight (g/m²) | | 0.6% | 0.5% | 0.5% | 0.5% | 0.7% | 0.2% | 0.3% | 0.5% | 0.5% | 0.7% |
| | Tensile strength (N) | Warp | 2.4% | 2.8% | 1.1% | 1.5% | 2.1% | 0.9% | 1.4% | 0.6% | 4.0% | 2.2% |
| | | Weft | 1.3% | 1.2% | 1.2% | 1.4% | 3.5% | 1.2% | 1.6% | 1.4% | 2.4% | 3.6% |
| Weaving bar defects (points/100 m) | | | 0.5 | 0.6 | 0.7 | 0.7 | 0.3 | 0.8 | 1.2 | 0.4 | 0.8 | 1.5 |

As shown in Table 1, the base fabrics fabricated in Examples 1 to 5 were excellent in weaving density evenness in the base fabric weft direction. Further, the base fabrics fabricated in Examples 1 to 5 were also excellent in original-yarn strength utilization rate and quality.

Meanwhile, the base fabrics fabricated in Comparative Examples 1 to 5 were low in evenness of the weaving density in the base fabric weft direction or in original-yarn strength utilization rate. Further, the base fabrics fabricated in Comparative Examples 2 and 5 were high in weaving bar defect, and it could not be evaluated that the quality was excellent. Therefore, there was a fear in that, depending on the position of the base fabric to be collected at the time of cutting, those base fabrics were liable to cause unevenness t2 is defined as tenacity per 1 dtex of a yarn used for the weft (cN/dtex);
F1 is defined as warp total fineness (dtex);
F2 is defined as weft total fineness (dtex);
D1 is defined as warp-direction weaving density (threads/inch); and
D2 is defined as weft-direction weaving density (threads/inch).

2. The base fabric according to claim 1, wherein the number of weaving bar defects is equal to or less than 1.0 points/100 m.

3. A method of manufacturing the base fabric for an airbag according to claim 1, wherein equipment configured to take up the base fabric is provided in a weaving step, and in the equipment, the base fabric is taken up with a rubber roll having a surface roughness of from 75 μm to 110 μm.

4. An airbag fabricated by sewing the base fabric according to claim 1.

5. A method of manufacturing the base fabric for an airbag according to claim 2, wherein equipment configured to take up the base fabric is provided in a weaving step, and in the equipment, the base fabric is taken up with a rubber roll having a surface roughness of from 75 μm to 110 μm.

6. An airbag fabricated by sewing the base fabric according to claim 2.

\* \* \* \* \*